United States Patent [19]

Atsuta et al.

[11] 3,738,284
[45] June 12, 1973

[54] LONGITUDINALLY AND TRANSVERSELY MOVABLE TRUCK

[75] Inventors: Hisayoshi Atsuta; Yokichi Koetsuka, both of Ishikawa, Japan

[73] Assignee: Kabushiki Kaisha Komatsu Seisakusho (Komatsu Ltd.), Tokyo, Japan

[22] Filed: Apr. 23, 1971

[21] Appl. No.: 136,903

[52] U.S. Cl.............. 105/177, 104/50, 180/1 AW, 280/150.5
[51] Int. Cl....... B60s 13/02, B61f 13/00, B61j 1/10
[58] Field of Search .................... 105/177; 104/50; 180/1 AW; 280/150.5

[56] References Cited
UNITED STATES PATENTS
1,017,290  2/1912  Ham et al. .......................... 105/177
3,269,744  8/1966  Dobson .......................... 105/177 X Primary Examiner—Robert G. Sheridan
Assistant Examiner—Howard Beltran
Attorney—Steinberg & Blake

[57] ABSTRACT

A longitudinally and transversally moving bolster truck is provided with two sets of wheels for use in the two different travelling directions respectively. Wheel lifting means are arranged to bring alternatively one set of wheels into contact with rails. Each of wheel lifting means comprises a wheel. The wheel is journaled in an arm pivoted on the body of the truck so as to permit vertical oscillation. Links are pivoted at the free end of said arm so as to permit oscillation in the same direction. A screw shaft which can be rotated by means of a motor is horizontally journaled in the body of the truck. Said links reciprocally engage at the free ends thereof with said screw shaft through a female screw member.

6 Claims, 9 Drawing Figures

PATENTED JUN 12 1973

INVENTORS
HISAYOSHI AISUTA AND
BY YOKICHI KOETSUKA

Steinberg & Blake
attys

LONGITUDINALLY AND TRANSVERSELY MOVABLE TRUCK

BACKGROUND OF THE INVENTION

In a press equipped with a moving bolster apparatus, this moving bolster apparatus according to the invention provides easy travelling in both the longitudinal and transverse directions in travelling the moving bolster for exchange of molds, in such a way that the wheels inside the bolster can be transfered vertically, so that it may be relatively separated from the surface of travelling rails.

A primary object of the present invention is to provide a lifting mechanism of the moving bolster, the essential matter of this invention, comprising a motor used as prime mover, a screw shaft and a female screw member in which a plurality of balls are used to reduce the friction therebetween for higher efficiency, said screw shaft and female screw member being provided at the end of a horizontal transmission shaft, and a link which is located approximately in the vertical position and which connects the center of said female screw member to the free end of a wheel-equipped lever which is vertically pivoted. With the lifting mechanism thus constructed, the moving bolster apparatus may be so raised or lowered that the female screw member may be reciprocally moved by revolution of the motor and along with the movement of the female screw member, the wheel can be transfered vertically.

Another object of the invention is to provide a bolster apparatus of the type described, comprising a transmission shaft for transmitting revolution to said screw shaft and a torque limiter means provided on said transmission shaft for preventing said female screw members and said screw shafts from being excessively fastened to said brackets of the truck.

Further object of the invention is to provide a bolster apparatus of the type described, comprising couplings provided on said transmission shaft and said screw shafts for fine adjustment of the vertical position of said one set of wheels.

DESCRIPTION OF THE PREFERRED EMBODIMENT

An embodiment according to the invention will be explained below with the accompanying drawings.

Figure 1A:
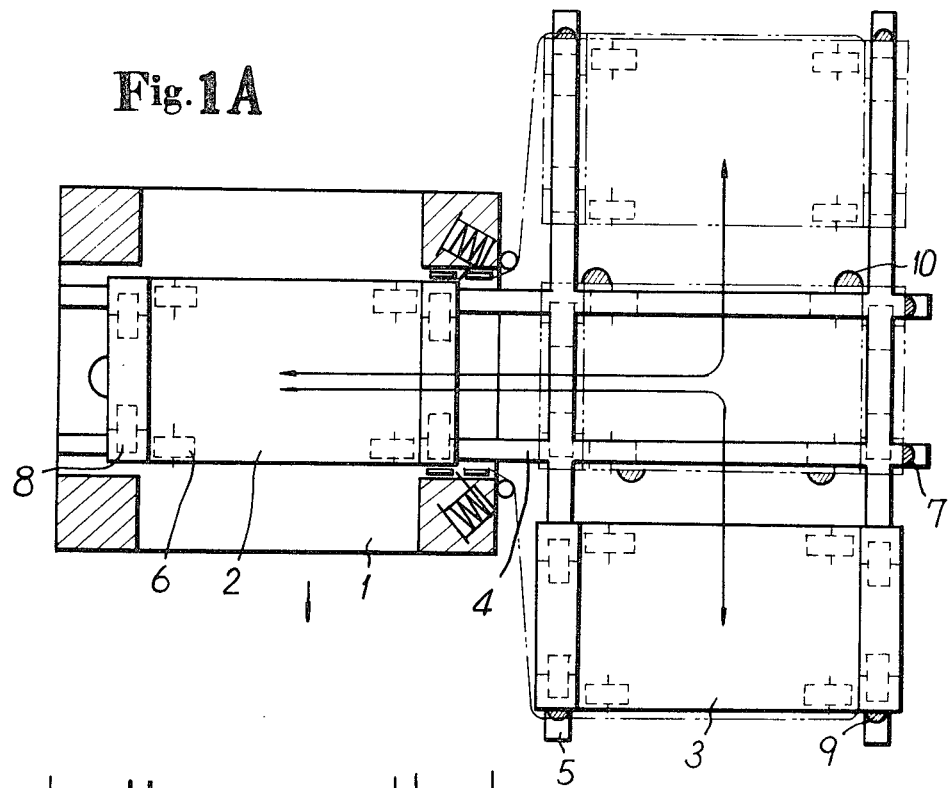
FIG. 1A and 1B show schematically a plan view and side view of a press provided with an embodiment of a longitudinally and transversally moving bolster apparatus according to the invention respectively.
Figure 1B:
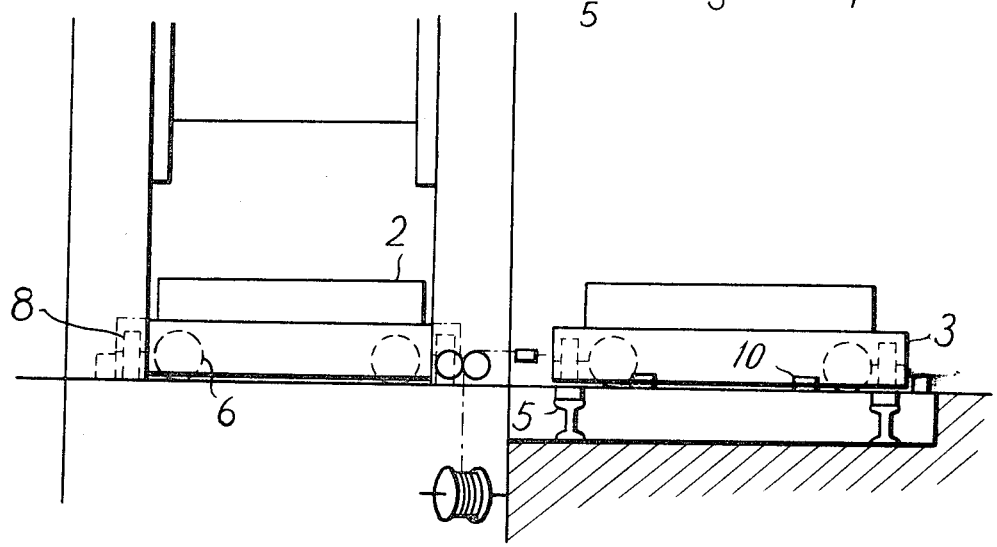

As shown in FIGS. 1A and 1B, in the body of a press 1 there are provided with two pairs of moving bolster trucks 2 and 3, right and left or longitudinal rails 4 and before and behind or transversal rails 5 being laid down for travelling.

The travelling process of the trucks 2 and 3 will be described in detail. In the case of longitudinal travelling from the press body 1, the longitudinally travelling wheels 6 arranged in the moving bolster truck 2 or 3 are lowered until the lower surface thereof and transversal wheels 8 are relatively separated from the upper surface of a bed, so that only the longitudinal wheels 6 bear on the rails. Accordingly, the moving bolster 2 or 3 may be travelled along the longitudinal rails 4 by the use of these wheels 6, and subsequently when the truck 2 or 3 has reached the end of the longitudinal movement or the intersecting point with the transversal rails, the truck 2 or 3 is struck against stops 7 to set the center thereof to that of the transversal rails 5 for subsequent transversal travelling. Prior to this transversal travelling, the wheels 6 are withdrawn so that only the transversal wheels 8 may bear on the transversal rails 5, and thus the moving bolster 2 or 3 can be travelled along in the transversal direction by rotating them on the rails 5. For subsequent transversal travelling at the end of the transversal rails 5, the truck 2 or 3 may be stopped by means of stops 9 and located at the position shown in the drawing, out of the line of the body of the press.

On the other hand, in the case of travelling the truck 2 or 3 from the outside of the press body to the inside thereof, the truck 2 or 3 may be conversely operated in such a way that it may be travelled by means of the wheels 8 secured not to move vertically until it strikes against stops 10 at the intersecting point of the longitudinal and transversal rails 5 and 4 to be stopped, at the position thereof the wheels 6 being lowered until the wheels 8 are relatively separated from the rails with the result of that only the wheels 6 bear on the rails. In this way, the wheels 6 can be rotated on the rails for travelling.

Figure 2A:
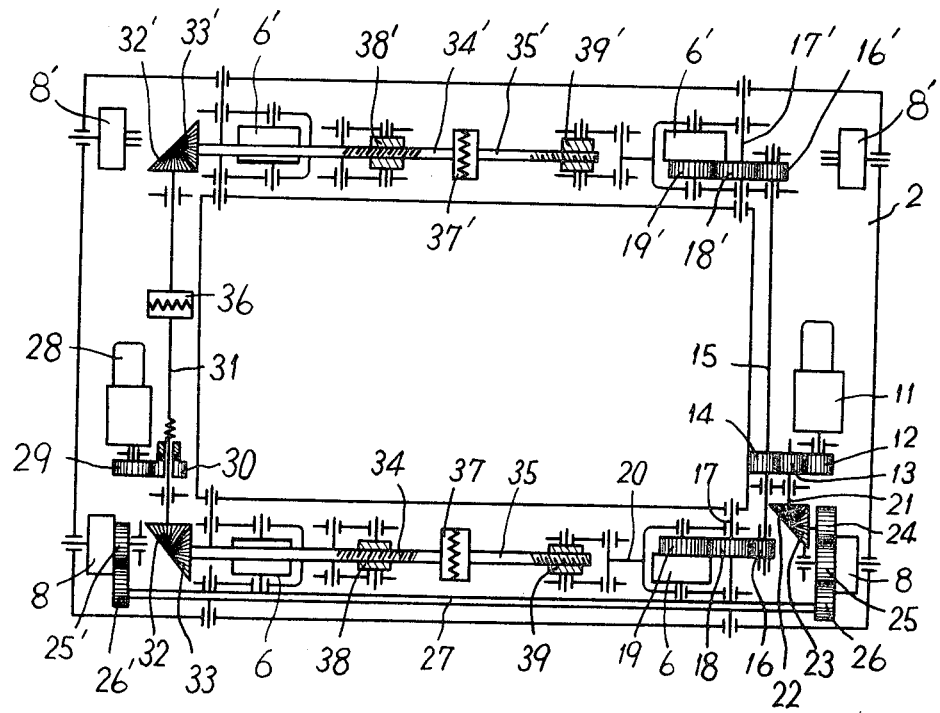
FIG. 2A and 2B show an arrangement plan view and side view of wheels, transmission system and lifting means assembled in the moving bolster apparatus according to the invention, respectively.
Figure 2B:
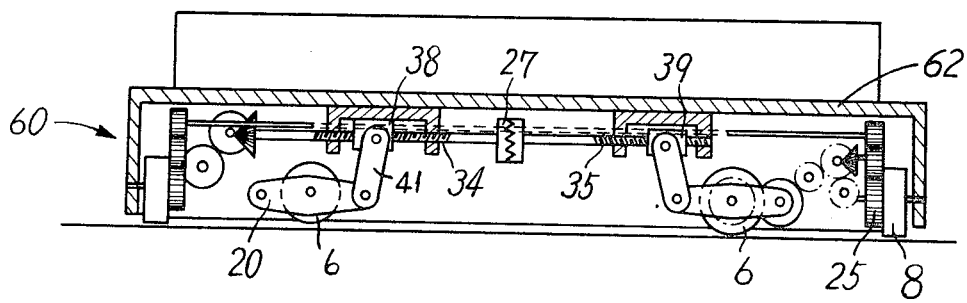

Referring to FIGS. 2A and 2B, the operational mechanisms of various means inside the moving bolster truck 2 or 3 will be explained below in detail.

The travelling means are driven through reduction gears by a motor 11 acting as a prime mover. A gear 12 transmits revolution to gears 13 and 14 for transversal and longitudinal travelling, respectively. In the case of longitudinal travelling, revolution is transmitted to the longitudinal wheels 6 and 6' through engaged gears 16, 16', 18, 18', 19 and 19' for travelling of the truck 2 or 3. In transverse travelling, a right wheel 8 in the front is driven through a transmission shaft 21, bevel gears 22 and 23 and spur gears 26 and 25, while a left wheel in the front is rotated through a gear 26, a transmission gear 27 and gears 26' and 25' for travelling the truck.

The lifting mechanism of the truck, the essential portion of this invention will be explained in detail referring to FIGS. 2A, 2B and 3A, 3B.

By means of a motor 28 provided as a prime mover screw shafts 34, 34', 35 and 35' are rotated through gears 29 and 30, a transmission shaft 31 and bevel gears 32 and 33, and then female screw members 38, 38', 39 and 39' afford the lifting or raising and lowering movement to four wheels 6, 6, 6 and 6 for longitudinal travelling. At the screw shafts 34, 34', 35 and 35' and the female screw members 38, 38', 39 and 39', a plurality of balls are used to reduce the friction therebetween for higher efficiency. In order to afford the lifting motion to these four wheels 6, 6, 6 and 6 with their vertical positions kept in the identical level, there are provided with couplings 36, 37 and 37' of adjustable construction.

Figure 3A:
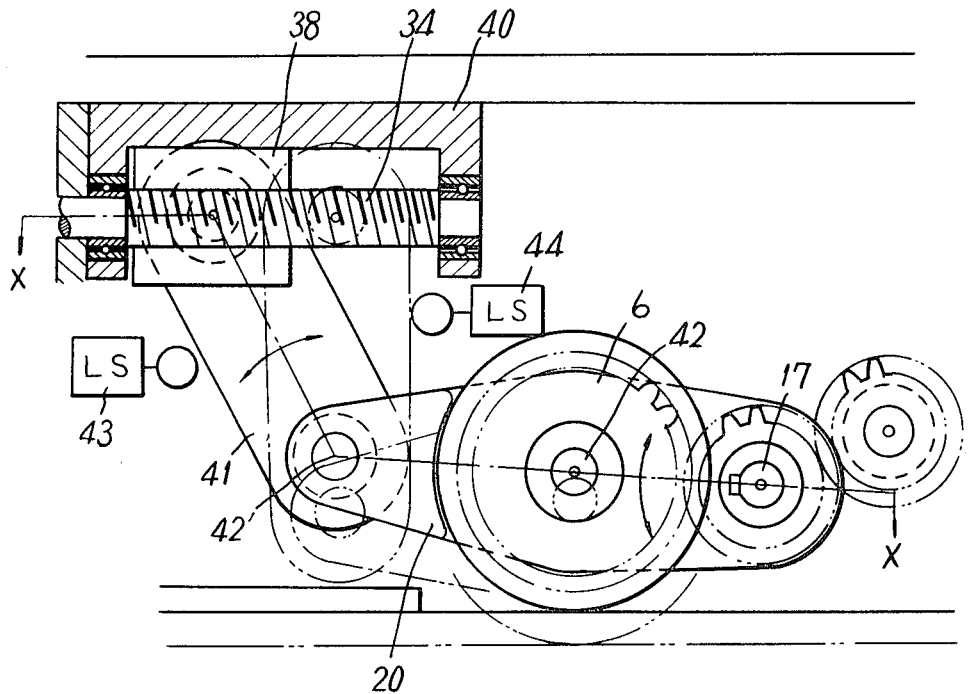
FIG. 3A and 3B show a detail side view and sectional view, taken along line X—X of FIG. 3A, of a wheel lifting means for use in travelling the bolster apparatus according to the invention.
Figure 3B:
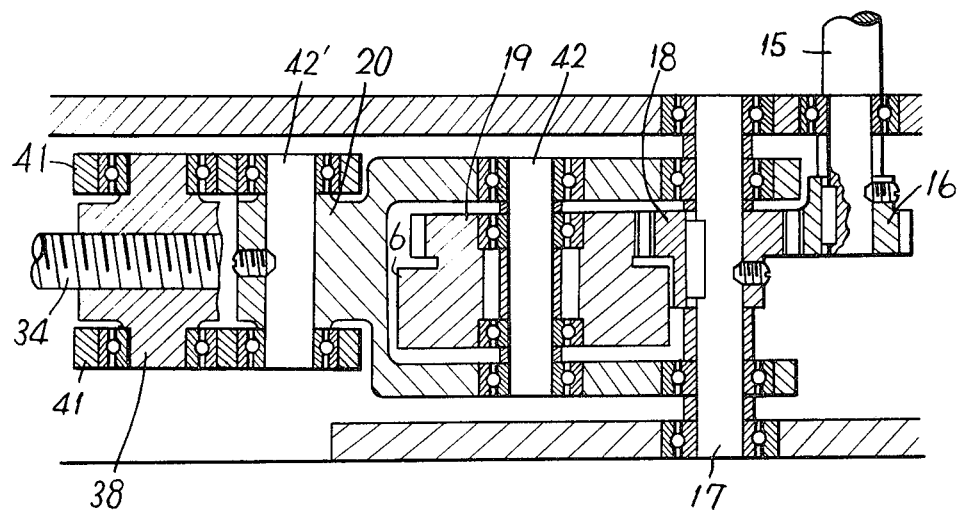

The lifting mechanism of the longitudinally travelling wheel 6 will be explained again in detail referring to FIGS. 3A, 3B.

A female screw member 38 engages with a screw shaft 34, said screw shaft 34 being rotatably supported in a bracket 40. The female screw member 38 may be horizontally reciprocated on the screw shaft 34 by revolution thereof and is provided with rods projecting out of both sides thereof so as to pivotally mount links 41.

The horizontal wheel 6 is attached to an arm 20 with a pin 42. One end of the arm 20 is pivoted on the body of the truck 2 or 3 with a pin 17, while the other end thereof is also pivoted on the free ends of the links 41 with pin 42', whereby the arm 20 is connected to said female screw member 38. Accordingly, the lifting movement of the wheel 6 may be effected in such a way that the revolution of the ball screw causes the oscillating movement of the link 41, the position of the pin 42' being vertically transfered, resulting in the vertical oscillation of the arm 20 round the pin 17. In this way, the wheel 6 may be vertically transfered, that is the truck 2 or 3 can be raised or lowered. The lifting movement of the wheel is limited by means of a limit switch 43 at the completed end of raising movement and by means of the other limit switch 44 at that of lowering movement for determining the stop position of the lifting movement.

FIG. 4 illustrates in detail couplings 36, 37 and 37' provided for connection of the screw shafts 34 and 34', 34 and 35, or 34' and 35' respectively, in order to adjust the disparity of four wheels 6, 6, and 6 in the vertical position. These couplings used to transmit revolution to the respective screw shafts, are provided on the surface of flanges thereof with a plurality of accurate openings 51, 51 . . . for assembling the flanges, so that the connecting phase between the screw shafts 34, 35 . . . can be finely adjusted by inserting bolts 46, 46 . . . into said opening 51, 51 . . . with the flange being turned. In these couplings, the coupling flanges 45, 47 are connected by fastening ring nuts 48 on the shafts 34 and 35 and besides the coupling flanges 45, 47 and 50 assembled are fastened with the bolts 46.

Figure 5:
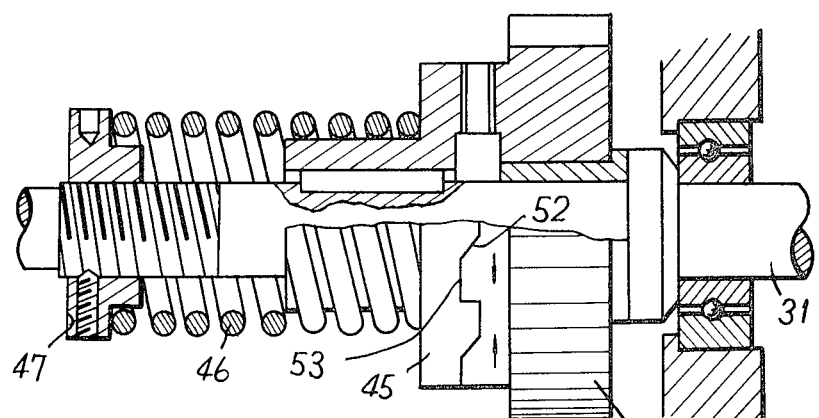
FIG. 5 shows a detail constructional sectional view of a torque limiter coupling means provided on a transmission shaft to prevent the transmission of excessive torque in transfering a wheel.

The coupling shown in FIG. 5 is provided to prevent the screw shaft 39 and the female screw member 38 from being excessively fastened to the bracket 40 by a torque caused due to inertia of the coupling after the operation of the limit switch 43 at the completely lowered end of the truck. Should a torque in one direction (the lowering direction of the truck) develop into more than the designed valve, a thrust force in the axial direction is caused due to inclined portions 52 in a one-way jaw clutch 53 of the coupling 45, a spring 46 being compressed until the coupling 45 and the jaw clutch 53 of gear 30 are separated each other, so that the transmission of an excessive torque may be prevented. A spring seat 47 may be adjustably mounted on a screw shaft. As stated above, this coupling may be constituted so as to permit adjustable operation of only a transmission torque in the lowering direction of the truck, while in raising the truck the jaw clutch 53 is formed not to cause a slip to ensure the reliable raising movement.

Figure 4A:
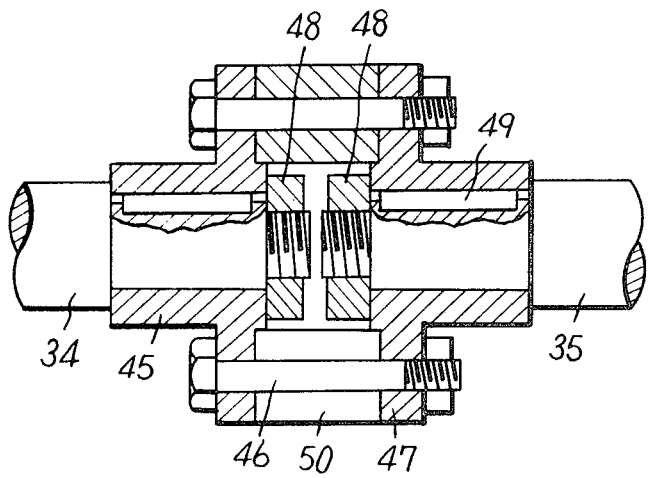
FIG. 4A show a detail longitudinal sectional view of an adjustable coupling provided on a transmission shaft in order to adjust the vertical position of wheels transfered vertically and FIG. 4B shows an arrangement plan of openings for assembling flanges of FIG. 4A.
Figure 4B:
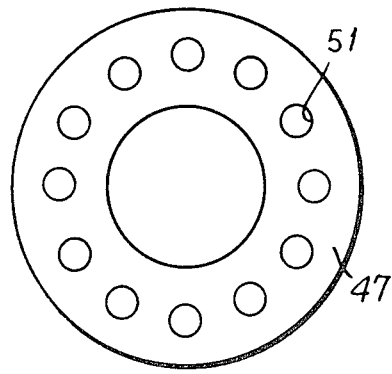

As is apparent particularly from FIG. 2B, the vehicle of the invention has not only a first set of wheels 8 which respectively have parallel axes of rotation and a second set of wheels 6 which respectively have parallel axes of rotation perpendicular to those of the wheels 8, in addition the vehicle of the invention includes a frame means 60 provided with a horizontal wall 62 beneath which all of the structure of the invention is located. This latter structure includes the plurality of lever means 20 which respectively support the plurality of wheels 6 for rotation about their axes, the plurality of lever means 20 being supported by the frame means 60 for swinging movement at the region of one of the ends of the lever means 20 about axes parallel to those of the second set of wheels 6. The plurality of lever means 20 are pivotally connected at their opposite ends to the plurality of link means 41 which respectively extend upwardly from the plurality of lever means and which are pivotally connected at their upper end regions to the plurality of nuts 38, 39, 38', and 39'. The screws 34, 35, 34', and 35' respectively form a plurality of screw means extending threadedly through these nuts and it will be noted that the plurality of screw means extend horizontally beneath the wall 62 of the frame means 60 while the plurality of lever means 20 also extend substantially horizontally while the plurality of lever means 41 extend substantially vertically. Thus, upon rotation of the plurality of screw means by the drive means which includes the motor 28 and the transmission driven thereby the several nuts will be moved along the screws horizontally beneath the horizontal wall 62 so as to raise or lower the second set of wheels 6 within the limits provided by the limiter switch means 43, 44 shown in FIG. 3A and described above. FIG. 5 shows the torque-limiting means for limiting the force transmitted from the drive means to the screws. FIGS. 4A and 4B show the adjustable coupling means interconnecting the coaxial screws 34, 35 or 34', 35'. By removing the bolts 46 and turning one of the coupling components with respect to the other it is possible to adjust the elevation of at least one of the wheels 6 so that all of the wheels 6 will have the same elevation, as described above. The motor 11 and the transmission driven thereby serves as a propelling means for the vehicle, and it will be noted that the gears 18 and 18' shown in FIG. 2A are coaxial with the shafts 17 and 17', respectively, about which the pair of lever means which carry the right wheels 6 and 6' of FIG. 2A swing, the latter wheels respectively being fixed coaxially to the gears 19 and 19' which respectively mesh with the gears 18 and 18', so that in this way the propelling means maintains its driving connection to the right wheels 6 and 6' of FIG. 2A during raising and lowering of these wheels. As is particularly apparent from FIG. 2B, all of the structure for raising and lowering the second set of wheels 6, 6' is situated beneath the horizontal wall 62 of the frame means 60, as a result of the horizontal arrangement of the screws and plurality of lever means 20 and the vertical arrangement of the link means 41 extending between the nuts and the plurality of lever means. Thus an exceedingly compact structure is provided located in its entirety beneath the wall 62 which is situated itself at a relatively low elevation. In this way it is not required that any part of the structure for raising or lowering the second set of wheels extend upwardly beyond the wall 62.

As mentioned above, this invention provides the characteristics that powerful raising and reliable lowering movement can be efficiently made with the simple construction because of selective contact of the wheels with the rails.

What is claimed is:

1. In a vehicle, frame means including a horizontal wall, a first set of rotary wheels carried by said frame means beneath said wall thereof and respectively having parallel axes of rotation, said first set of wheels supporting the vehicle for movement in a direction perpendicular to said axes of rotation, a second set of wheels having parallel axes of rotation perpendicular to the axes of rotation of said first set of wheels, said second set of wheels supporting the vehicle for movement in a direction perpendicular to the direction of movement provided by said first set of wheels, a plurality of lever means respectively supporting said second set of wheels for rotary movement, said plurality of lever means respectively being swingably carried by said frame means beneath said wall thereof at one end region of each of said lever means, said frame means supporting said plurality of lever means for swinging movement respectively about axes parallel to the axes of rotation of said second set of wheels, a plurality of link means pivotally connected respectively to said plurality of lever means at end regions thereof opposite from said end regions which are swingably carried by said frame means, a plurality of nuts pivotally connected respectively to said plurality of link means at end regions of the latter distant from said lever means, said nuts and link means being located beneath said wall of said frame means, a plurality of horizontally extending screw means respectively threaded through said nuts and extending beneath said wall of said frame means while supported thereby for rotary movement, said plurality of screw means when rotating advancing said nuts horizontally to act through the latter on said plurality of link means to bring about swinging of said plurality of lever means for lowering said second set of wheels to an elevation beneath said first set of wheels when the vehicle is to be supported on said second set of wheels and for raising said second set of wheels to an elevation higher than said first set of wheels when the vehicle is to be supported on said first set of wheels, and drive means operatively connected to said plurality of screw means for simultaneously rotating the latter to bring about simultaneous lowering of said second set of wheels when the vehicle is to travel thereon and simultaneous raising of said second set of wheels when the vehicle is to travel on said first set of wheels.

2. The combination of claim 1 and wherein said plurality of lever means respectively extend in a generally horizontal direction at an elevation lower than said plurality of screw means, and said plurality of link means respectively extending in a generally vertical direction from said plurality of lever means to said plurality of nuts.

3. The combination of claim 1 and wherein a torque-limiting means is operatively connected between said drive means and screw means for limiting the torque delivered from said drive means to said screw means.

4. The combination of claim 1 and wherein said plurality of screw means include at least one pair of coaxial screws and a coupling means releasably coupling said pair of coaxial screws to each other for angular adjustment one with respect to the other to adjust the elevation of at least one of said second set of wheels with respect to another of said second set of wheels.

5. The combination of claim 1 and wherein said drive means is electrical and wherein a limit switch means is situated in the path of movement of at least one of said link means for limiting the operation of said drive means and thus limiting the extent to which said second set of wheels are raised and lowered.

6. The combination of claim 1 and wherein a propelling means is operatively connected with both sets of wheels for rotating the latter to propel the vehicle, said propelling means including gear transmissions for both sets of wheels and one of said gear transmissions including at least a first gear coaxially fixed to one of said second set of wheels for rotation therewith and a second gear meshing with said first gear and having an axis of rotation coinciding with the axis of rotation of the lever means which carries that one of said second set of wheels to which said first gear is fixed, so that the transmission remains operatively connected to at least said one wheel of said second set of wheels during raising and lowering thereof.

* * * * *